(12) United States Patent
Merbach et al.

(10) Patent No.: US 7,975,146 B2
(45) Date of Patent: Jul. 5, 2011

(54) METHOD AND APPARATUS FOR RECOGNITION OF BIOMETRIC DATA FOLLOWING RECORDING FROM AT LEAST TWO DIRECTIONS

(75) Inventors: Peter-Michael Merbach, Zella-Mehlis (DE); Rudolf Hauke, Niederstotzingen (DE); Hans-Peter Nothaft, Neu-Ulm (DE)

(73) Assignee: TBS Holding AG, Pfaeffikon (CH)

( * ) Notice: Subject to any disclaimer, the term of this patent is extended or adjusted under 35 U.S.C. 154(b) by 868 days.

(21) Appl. No.: 10/509,471

(22) PCT Filed: May 14, 2003

(86) PCT No.: PCT/DE03/01556
§ 371 (c)(1),
(2), (4) Date: Sep. 28, 2004

(87) PCT Pub. No.: WO2004/104906
PCT Pub. Date: Dec. 2, 2004

(65) Prior Publication Data
US 2005/0111703 A1    May 26, 2005

(51) Int. Cl.
*H04K 1/00* (2006.01)
(52) U.S. Cl. ...................................... 713/186
(58) Field of Classification Search .................. 713/176, 713/186; 726/5; 382/115–116
See application file for complete search history.

(56) References Cited

U.S. PATENT DOCUMENTS

| | | | | |
|---|---|---|---|---|
| 4,505,583 A * | 3/1985 | Konomi | ........................... | 356/73 |
| 6,195,104 B1 * | 2/2001 | Lyons | ........................... | 345/473 |
| 6,404,904 B1 | 6/2002 | Einighammer et al. | ...... | 382/124 |
| 2004/0042642 A1 * | 3/2004 | Bolle et al. | ..................... | 382/115 |
| 2004/0130720 A1 * | 7/2004 | Maeda et al. | ................. | 356/419 |
| 2004/0218788 A1 * | 11/2004 | Geng | ............................. | 382/118 |
| 2005/0111705 A1 * | 5/2005 | Waupotitsch et al. | ........ | 382/118 |
| 2006/0056661 A1 * | 3/2006 | Einighammer et al. | ...... | 382/115 |
| 2006/0285736 A1 * | 12/2006 | Brown | ........................... | 382/128 |

FOREIGN PATENT DOCUMENTS

| | | |
|---|---|---|
| DE | 195 16 662 | 11/1996 |
| DE | 101 11 671 | 10/2001 |
| DE | 10123561 | 10/2001 |
| DE | 10128717 | 12/2002 |
| EP | 0359554 | 3/1990 |
| EP | 1073988 | 2/2001 |
| WO | WO 93/16441 | 8/1993 |
| WO | 9837507 | 8/1998 |

(Continued)

OTHER PUBLICATIONS

Computer translated English Version of IDS submitted by applicant. European Patent No. DE10123561; translated on Dec. 2, 2007; pp. 1-3.*

(Continued)

*Primary Examiner* — Benjamin E Lanier
*Assistant Examiner* — Samson Lemma
(74) *Attorney, Agent, or Firm* — Muncy, Geissler, Olds & Lowe, PLLC (57) ABSTRACT

A method and an apparatus for recognition of biometric data with high fraud resistance, in particular for recognition of characteristics of fingers and of faces, wherein an object is acquired by optical scanning and numerical parameters are acquired by means of digital image processing.

20 Claims, 6 Drawing Sheets

FOREIGN PATENT DOCUMENTS

WO           0159708         8/2001
WO     WO 02101668 A2 * 12/2002

OTHER PUBLICATIONS

Computer translated English Version of IDS submitted by applicant. European Patent No. DE10123561; translated on Dec. 2, 2007; pp. 1-3, see also the claims and drawing.*

A. Yokoyama et al., Realtime Range Imaging using Adjustment-Free Photo-VLSI,-Silicon Range Finder-; Intelligent Robots and Systems '94; Proceedings of the IEEE/RSJ/GI International Conference on Munich, Germany Sep. 12-16, 1994, pp. 1751-1758, XP010142068; ISBN: 0-7803-1933-8.

N. Sarris et al., "Three Dimensional Facial Model Adaptation"; Prodeedings of 7$^{th}$ IEEE International Conference on Image Processing, Vancouver, Canada; Sep. 10, 2000; pp. 219-222; XP010529983.

* cited by examiner

METHOD AND APPARATUS FOR RECOGNITION OF BIOMETRIC DATA FOLLOWING RECORDING FROM AT LEAST TWO DIRECTIONS

The present invention relates to a method and an apparatus for recognition of biometric data with high fraud resistance, in particular for recognition of characteristics of fingers and of faces, wherein an object is acquired by optical scanning and numerical parameters are acquired by means of digital image processing.

BACKGROUND

In manifold applications, security systems are applied to refuse access to certain areas to unauthorized persons. Such areas are, for example, cash terminals, laboratory rooms to be kept secret and the like. These systems mainly use facilities for recognition of fingerprints and faces.

There are substantial attempts to overcome these systems. To increase the security, additional means are used, with which it is verified if it is the matter of a vital object.

In the prior art, systems are known in order to determine the vital functions of the objects by acquiring oxygen saturation, blood pulse or other parameters in order to identify imitations.

In European Patent Document EP 0 359 554 B1, an arrangement for determination of fingerprints is described, with which zones of the finger are imaged onto a light receiver. The arrangement possesses a light source, means for guiding the light rays which are running from the light source onto the surface of the finger to be detected, an optical imaging system which creates an image of an irradiated part of the sample, a light detector facility for detecting the image and a facility for the output of a detection signal. With the arrangement, it shall be determined if the sample is a biological object or an imitation.

For this, the light detector is provided with a light receiver area which is divided into a plurality of zones so that an image of the irradiated part is created on the light receiver area. The light detector possesses separated optical outputs for the light rays received in a plurality of zones respectively.

The discrimination if it is the matter of an authentic object, i.e. a vital finger, or an imitation is carried out by analyzing the course of the light, wherein the phenomenon that, in case of an authentic finger and an imitation, different courses of light result, is exploited.

Frequently, forgery is committed by applying masks on vital objects. In particular in the case of fingerprint recognition systems, it is tried to gain unauthorized access to secured areas by applying a thin layer of latex or of gelatin, on which prints of dermal ridges of a different person are located.

In case of the arrangement described in European Patent Document EP 0 359 554 B1, it is disadvantageous that foil-like imitations are not recognized.

Furthermore, in European Patent Document EP 1 073 988 B1, a system for recognition of hand and finger lines is described, which serves for the identification of persons. With this system, hand and/or finger lines, patterns of dermal ridges, patterns of the subcutis or the like are acquired optically touchlessly for acquisition of an image by using a light source, a polarization filter and a camera without mechanical movements of the arrangement. The optical acquisition is carried out by means of polarization filters placed in the optical path of illumination and in the optical path of imaging and by means of a fixedly arranged camera.

These known methods have the disadvantage that they are not able to recognize a mask which is applied to a vital object.

SUMMARY OF THE INVENTION

An object of the present invention is to specify a method and an apparatus of the initially said type with which a high fraud resistance is reached. The present invention is applicable modularly with existing methods of recognition and shall recognize imitations securely which have been created by applying masks onto the objects to be recognized.

The present invention provides a method for recogntion of biometric data, in particular for the recognition of characteristics of fingers and of faces of persons, comprising . . . . The present invention also provides a an apparatusfor carrying out such a method.

Advantageous embodiments are described in the specification and in the claims.

In the method according to the present invention, the object is acquired simultaneously from at least two different directions of imaging and, from at least two images, a three-dimensional model of the observed object is calculated, which is compared to a reference model which was acquired from several images, too. The object is identified to be correct, if the data acquired from the two images is simultaneously concordant with the reference model apart from respectively predetermined tolerances.

Two images are understood to be simultaneous if they are acquired within a period of time of at most 0,1 s so that a manipulation of the object by exchanging or altering can be excluded.

Preferably, the directions of imaging from which the object is observed, form an angle of 90 degrees and lie in one plane. Thereby, the object to be imaged can overlie a planar surface of an optical sensor or can be scanned touchlessly.

The method according to the present invention recognizes imitations with high security at checkpoints where personal data as fingers or faces are checked. The check is carried out by comparing data sets of two simultaneously taken images of the object to be examined with the data set of a stored three-dimensional reference object.

In case of checks that analyze the characteristics of a finger, imitations are usually created by an unauthorized person by gathering a fingerprint of an authorized person, transferring it onto a mask-shaped imitation and pulling the mask in the form of a thin foil over the finger. As fingerprints forged this way always acquire only a partial area of the finger, it is hardly possible for the unauthorized person to simultaneously present two images of different areas of the original finger to the security check, which are queried in the check, and thus to acquire and imitate the three-dimensional outline. The reason for this is that normally only latent prints, i.e. two-dimensional information, are left behind. Such information may be fingerprints or images of the object, preferably of a face or of a finger, which only contain two-dimensional information so that the unauthorized person would have to imitate exactly the stored three-dimensional reference model from one or several two-dimensional informations. It is also very improbable that an unauthorized person who slips the mask over his finger is concordant with the finger of the person to be imitated regarding the spatial structure.

For the unauthorized person, it is thus impossible to bring about these conditions required for the concordance of the three-dimensional models.

An advantageous embodiment of the present invention arises if, for characterizing the object, an image is used which does not contain all of the minutiae of the finger lines, but only characteristic profile data is acquired and used. These data structures are especially convenient to create indices of data bases and thus enable to considerably accelerate the identification of a person out of a large number of persons.

Because thus a smaller amount of data is necessary for the check, the speed of the check of a person can be increased, particularly in cases where many data sets need to be queried in order to check the entrance of a person, which is the case for example, if many persons are authorized to enter so that many reference data sets need to be queried for the access check of a person.

As meaningful data are convenient, for example:
a the width and the length of phalanxes,
the projected area of the phalanx or
coefficients of the type b/l or F/l or F/b or F/bl.

A convenient embodiment results from acquiring additional biometric features, for example a description of the nailbed using a two-dimensional profile function with values of the form (h(x), t(x)).

Another advantageous embodiment is arranged in a way that a light slit or raster is projected onto the object so that the projected slit forms a contour on the spatial surface of the object, wherein die illumination of the light slit or raster is carried out using light of a wavelength which is different from the wavelength which is used for the illumination of the main image and wherein the image of the light raster or slit is acquired selectively by a second camera due to the different light color. This image of the object allows a statement about the three-dimensional shape of the object. Then, the characterization of the contour of a partial area of the object serves as another parameter for recognizing the concordance of the object with the reference object.

In order to eliminate a circumvention of the check in cases where an attacker manages to overcome these methods of recognition by means of an artificial finger or an artificial face with three-dimensionally identically geometric characteristics, a spectroscopic and/or scattered-light-spectroscopic analysis can take place as additional action by directing an illuminating ray coming laterally from a light source onto the finger section and by analyzing, respectively, the reflected or the transmitted portion or both portions spectroscopically and/or scattered-light-spectroscopically by means of appropriate detectors.

Here, it is advantageous to use light wavelengths of about 678 nm and 808 nm, because the intensities of these two wavelengths differ clearly in transmission and reflection by vital objects because of the different extinction coefficients of haemoglobin and oxyhaemoglobin.

Thus, artificial, non-vital objects can be recognized with highest security.

In the practical application, the finger is illuminated by a ring-shaped, cross-shaped or pairwise arrangement of light sources of a defined wavelength, having the light receiver array as center. At first, the places of maximal intensity $P(\lambda i, max)$ are determined. Only the intensity of back-diffused light in the center of the places of maximal intensity $P_z(\lambda i, max)$ is analyzed. Thus, the measurement is carried out at a defined place. Thereby, it is advantageous that the signal-to-noise ratio is improved in the measurement of the summed up, backscattered signal.

The fraud resistance is better the more spectral lines are used for illuminating the finger, because an increase of the fraud resistance results from the additional discrimination characteristics.

As the absorption of light in high oxygen blood differs from that in low oxygen blood, light sources which radiate light with wavelengths of about $\lambda_1=678$ nm and about $\lambda_2=835$ nm can be used particularly for recognition of vital objects. The light wavelength of 678 nm exhibits the highest sensitivity for the recognition of the difference between high oxygen blood and low oxygen blood. This can be used, for example, for the proof that it is the matter of a vital object. In contrast, in case of illuminating the objects using light of a wavelength of about 835 nm, no difference is detectable between a vital and a non-vital object.

An arrangement suitable for application of the method is designed to arrange one or several light sources in a ring-shaped manner or at least pairwise in such a way that the object to be examined is illuminated punctually. The illumination can be carried out either directly or by means of an imaging optical system. The backscattered intensity distribution is acquired by a light receiver array.

The certainty of proof can be improved further by switching the light sources in a pulse-coded manner and synchronously thereto, performing the analysis by means of a CMOS camera.

BRIEF DESCRIPTION OF THE DRAWINGS

In the following, the present invention is further explained considering examples of embodiments.

In the appropriate figures, it is shown by:

FIG. 6 a schematic illustration of an arrangement for the analysis of scattered light, FIG. 7 an arrangement for fixation of the position of a hand, FIG. 8 characteristics of a human ear, FIG. 9 the front view of an arrangement with additional punctual illumination of a finger section, FIG. 10 the top view onto the arrangement shown in FIG. 8, and FIG. 11 the intensity distribution of the brightness of punctually illuminated finger sections.

DETAILED DESCRIPTION

Figure 1:
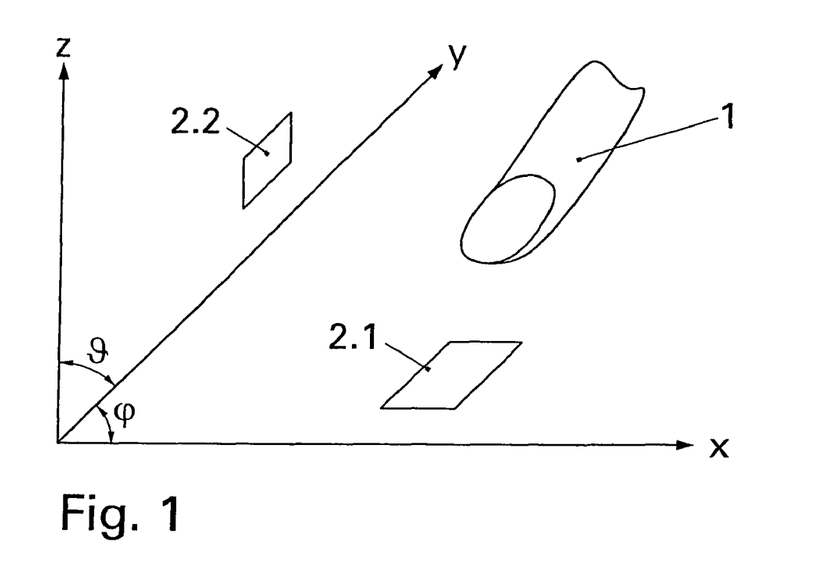
FIG. 1 a schematic illustration of an arrangement with two detectors.

FIG. 1 explains the basic way of operation of a facility for fraud-proof checking by simultaneous acquiring two partial images of the finger 1 from different directions. The position of the finger is defined by the coordinates x, y, z in a Cartesian coordinate system. As shown in this illustration, this finger is simultaneously acquired from a different angle of view, in addition to the detector 2.1 which is located in the x-y plane and acquires the image of the finger 1 in z-direction wherein this image results from laying onto a sensor or, preferably, from imaging. Preferably, the directions of imaging, from which the object is observed, form an angle of 90 degrees and lie in one plane. This means, that the angles $\phi$ and $\delta$ between the direction of imaging and a coordinate direction running through the finger's axis as y-axis, which are depicted in FIG. 1, have a value of 90°. A second image is recorded by the detector 2.2 which is located in the y-z plane in x-direction. The function values are compared to data of reference functions which exhibit an identical data structure and are stored in a data base.

The reference functions, then, look like $R_{xy}(x, y, m_{xy})$ for the reference image in the x-y plane, with which the image $F_{xy}$ taken in the x-y plane by the detector 2.1 has to be concordant and $R_{yz}(z, y, m_{yz})$ for the reference image in the x-y plane, with which the image taken in the y-z plane by the detector 2.2 has to be concordant.

The object is recognized to be correct if a satisfactory quantity of data, e.g. 90%, are concordant for $F_{xy}$ and $R_{xy}$ as well as for $F_{yz}$ and $R_{yz}$, respectively.

The images of the dermal ridges can be described by recognition functions of the form F(x, y, z, m).

For the arrangement depicted in FIG. 1, the function $F_{xy}(x, y, m_{xy})$ describes the image taken by the detector 2.1 in the x-y plane and the function $F_{yz}(z, y, m_{yz})$ describes the image taken by the detector 2.2 in the y-z plane, wherein $m_{xy}$ and $m_{yz}$ make up characteristic recognition attributes of dermal points in the respective planes.

Figure 2:
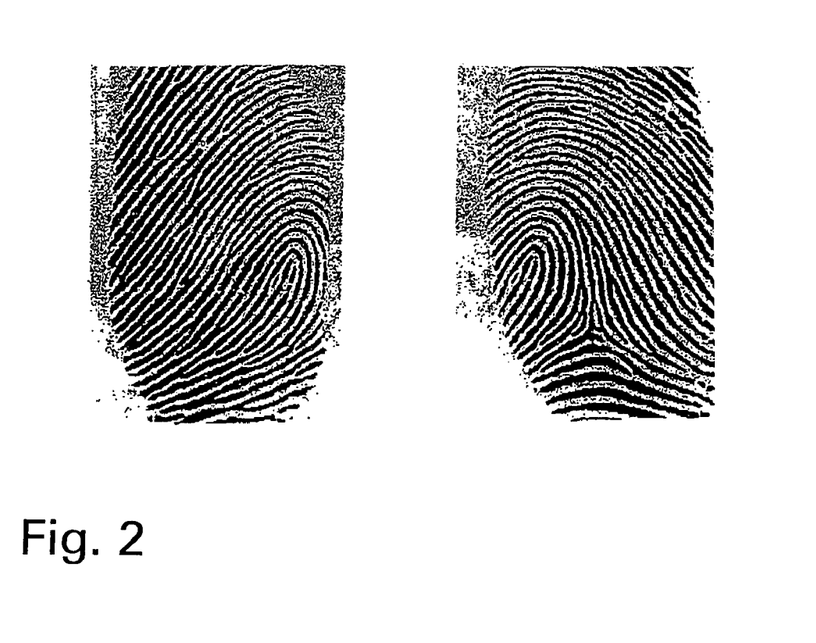
FIG. 2 examples for images of a finger section.

In FIG. 2, two illustrations of dermal ridges of a finger to be checked are depicted.

Figure 3:
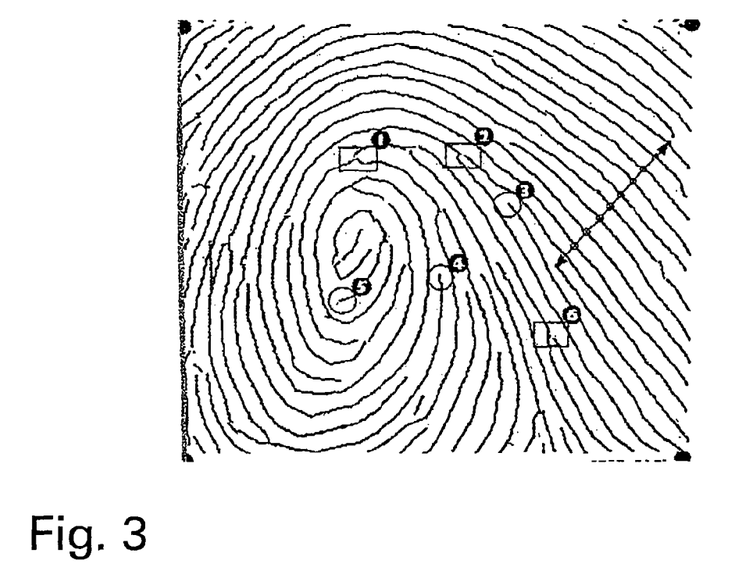
FIG. 3 a schematic illustration of the analysis of dermal ridges of a finger.

The analysis of the attributes m can be carried out by the method shown in FIG. 3, where the recognition attributes are analyzed by means of the relations of minutiae according to FBI/NIST. Here, special attributes of the dermal ridges are analyzed at discrete locations, for example bifurcations. In the case depicted, this is performed at the points 1 to 6.

Figure 4:
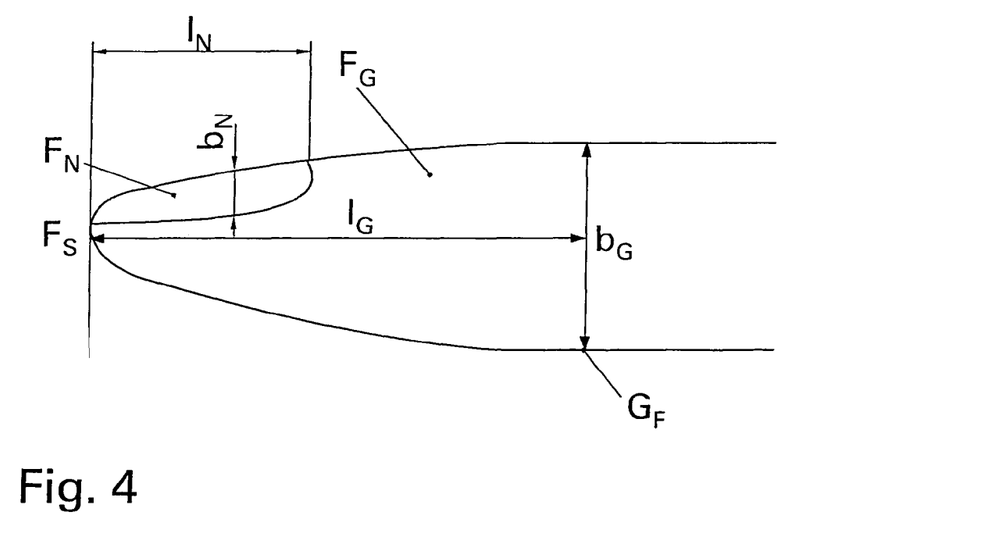
FIG. 4 characterizing geometric entities of a finger section.

FIG. 4 explains parameters characteristic for a finger's phalanx, which need a substantially less amount of data to describe a profile function in contrast to the data sets explained above with which relations of minutiae are described. Although, the characteristic parameters are suitable for a secure description of individual data of a finger. For this, discrete geometric structure attributes as the thickness of a finger at a certain location of a coordinate system, the shoulder of the nailbed and the like are used.

In the depicted case, entities which describe the geometric shape of the front phalanx serve for this. This phalanx ranges from the finger tip FS to the wrinkle GF of the phalanx. The entities used to its characterization are:

the length of the phalanx $l_G$ and width of the phalanx $b_G$,
the length of the nail $l_N$ and width of the nail $b_N$,
the projected area of the phalanx $F_G$ and the projected area of the nailbed $F_N$,
or coefficients deduced from these entities as, for example, $b_G/l_G$, $F_G/l$, $F_N/l$, $F_G/b_G$, $F_N/b_N$, $F_B/b_G l_G$ or $F_N/b_G l_G$.

Figure 5:
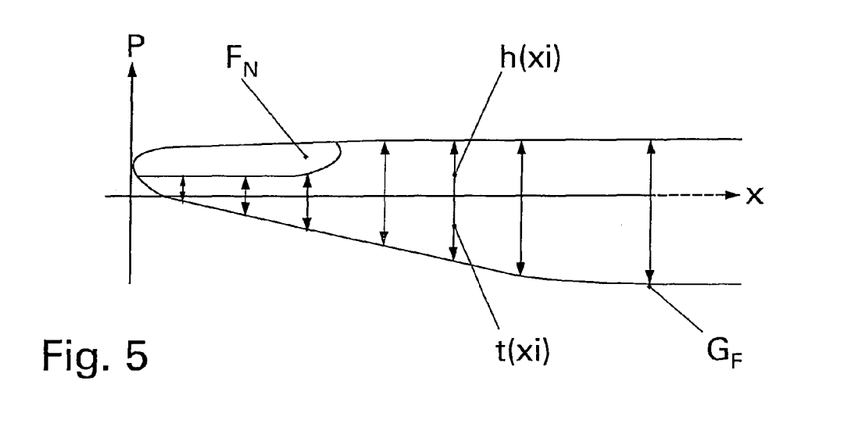
FIG. 5 coordinates for characterizing the finger section.

In FIG. 5, a possibility for acquiring the profile function as two-dimensional information is shown, wherein coordinate values of the border of the finger's phalanx yield biometric attributes. For this, the distances from a reference coordinate x are especially suitable. These can be, for example, the height distance h(x) between the top border of the finger and the reference coordinate at location x or the depth distance t(x) between the bottom border of the finger and the reference coordinate at location x. Additionally, parameters of a description of the nailbed can be included.

Figure 6:
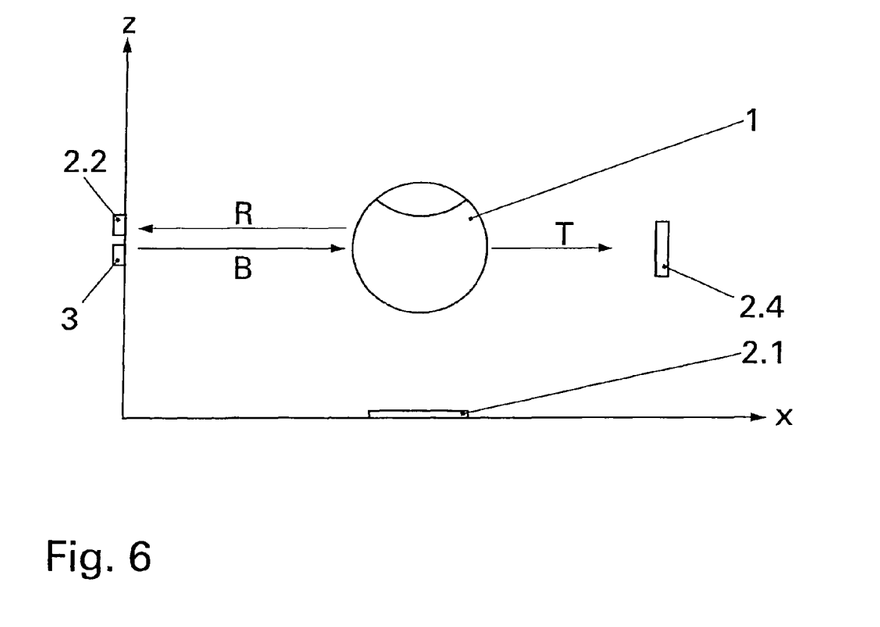

FIG. 6 shows an embodiment which enables a secure check also for the case where an unauthorized person manages to overcome the methods described above, for example, by an artificial finger with identical geometric attributes. This works by a spectroscopic and/or scattered-light-spectroscopic analysis by directing illuminating rays coming laterally from the light source 3 onto the finger 1 and by analyzing the reflected portion R and/or the transmitted portion T spectroscopically and/or scattered-light-spectroscopically. The light detector 2.2 serves for analyzing the reflected light portion R and the scattered light detector 2.4 serves for analyzing the transmitted light portion T.

This arrangement can be designed both as additional component and as independent controlling arrangement.

Advantageously, light wavelengths of about 678 nm and 808 nm are used for this.

Figure 7:
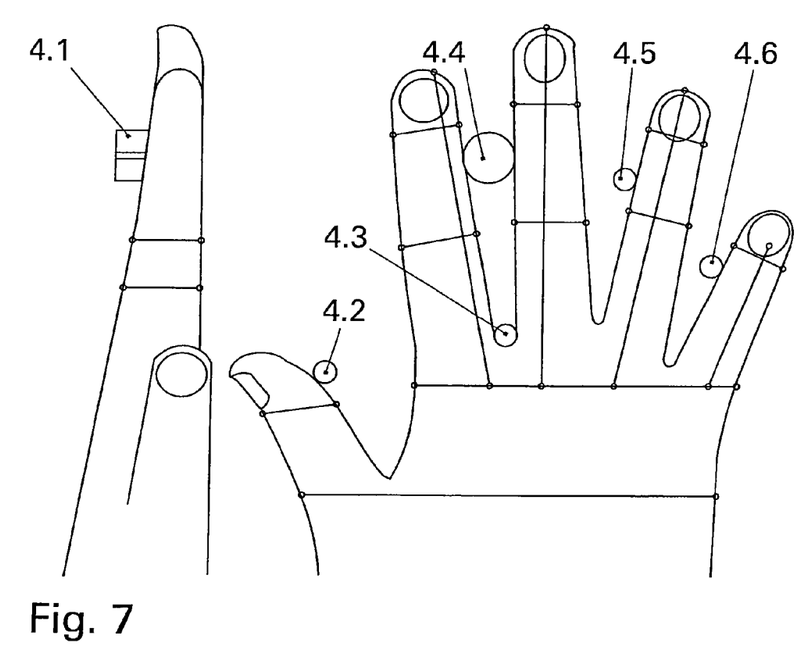

FIG. 7 explains a possibility for a defined fixation of a hand to be checked. At the depicted facility, a series of fixation elements 4 is arranged, wherein the height fixation is carried out by the element 4.1 and the lateral fixation is carried out by the elements 4.2 . . . 4.6. The sensors used for acquiring the images at the relevant partial areas of a finger, which are not depicted here, are located below the hand. As mentioned above, both touching and touchlessly scanning sensors can be used for this.

Figure 8:
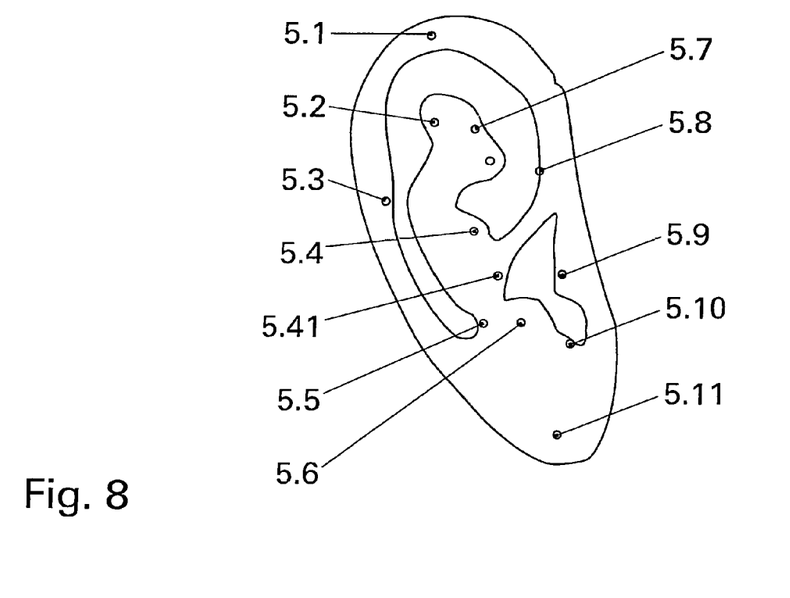

FIG. 8 shows characteristic attributes with which the authenticity of a face can be checked, considering as example a human ear. Shape and size of the ear are especially suitable to characterize persons. As especially suitable attributes can be used: the outer ridge (helix) 5.1, the inner ridge (anthelix) 5.2, the scaphoid fossa 5.3, the concha 5.4 with its upper (cymba) and the lower part (cavum) 5.4.1, the sulcus obliquus 5.7, the antitragus 5.6, the triangular fossa (fossa triangularis) 5.7, the leg of the outer ridge (curs helicis) 5.8, the tragus 5.9, the notch between the tragi (insicura intertragica) 5.10 and the lobe (lehulus auriculan) 5.11.

Figure 9:
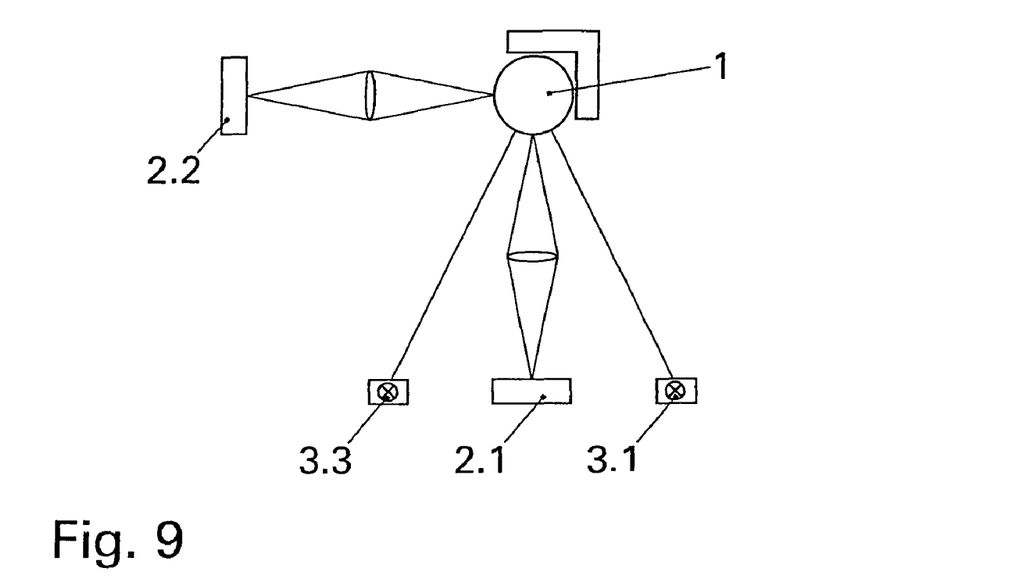
Figure 10:
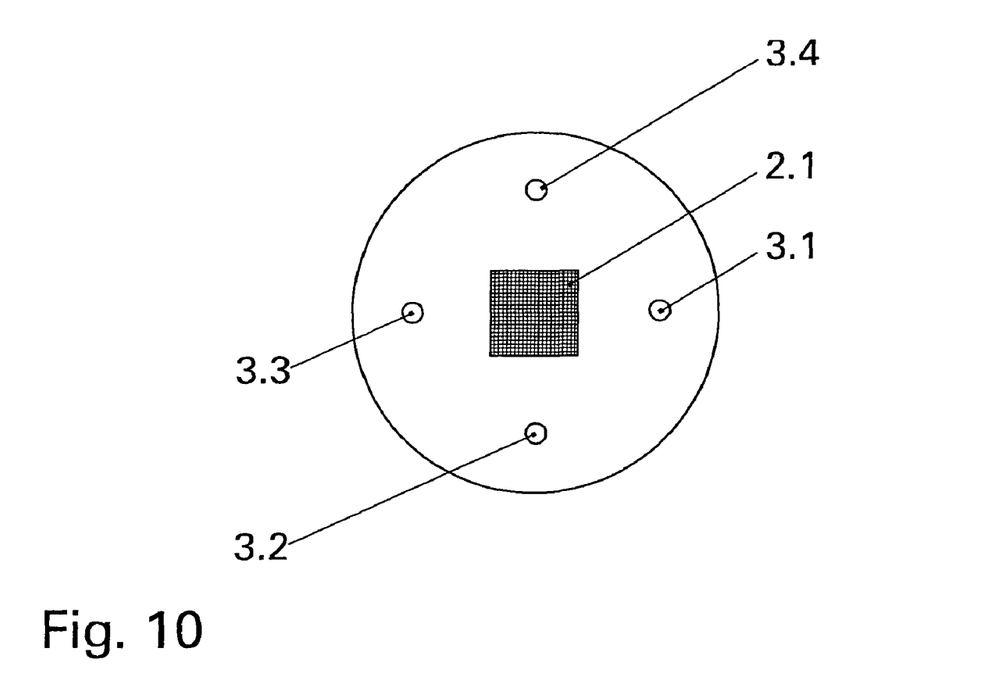

In the FIGS. 9 and 10, an arrangement is depicted with which a check of the authenticity of the object to be examined is carried out by additional punctual illumination. The discrimination if it is the matter of an authentic object, i.e. a vital finger, or of an imitation is carried out by an additional punctual illumination of selected points on the finger which are additionally imaged on the CMOS array of the sensor 2.1 and/or 2.2. Thereby, the phenomenon that the backscattering behavior of light is different between an authentic finger and a falsification/imitation due to different courses of light in the objects, is exploited. The recognition of imitations is done very easily this way, because they exhibit spectral backscattering properties which deviate from dermal tissue.

A large fraction of imitations can be rejected by regarding additional properties of the hand/of the finger in addition to the characteristic finger lines. Here, the scattering behavior of visible and infrared light in the skin is analyzed.

Light deeply penetrates the skin and is scattered in different depths. The depth of penetration depends on the tissue structure, the wavelength and the absorption. Thus, a strong dependence on the color results for the escaping light. Blue light penetrates the skin sparsely, therefore a small scattering halo results in case of punctual illumination whereas a large scattering halo results in case of red light with a large depth of penetration.

The optical properties of tissue are hard to imitate over the whole spectral range. Also, the volume effect, i.e. the scattering behavior of light in the depth of tissue, is difficult to imitate.

In the present invention, the measured characteristic scattering properties of light in the visible and infrared spectral range are used for the proof of vital tissue.

An advantageous embodiment is designed to carry out the arrangement as independent module which is provided with a pairwise arrangement of one ore several light sources which illuminate the finger punctually. The illumination can be carried out directly or via optics. The backscattered intensity distribution is analyzed, for example, by means of a CCD or CMOS camera.

Figure 11:
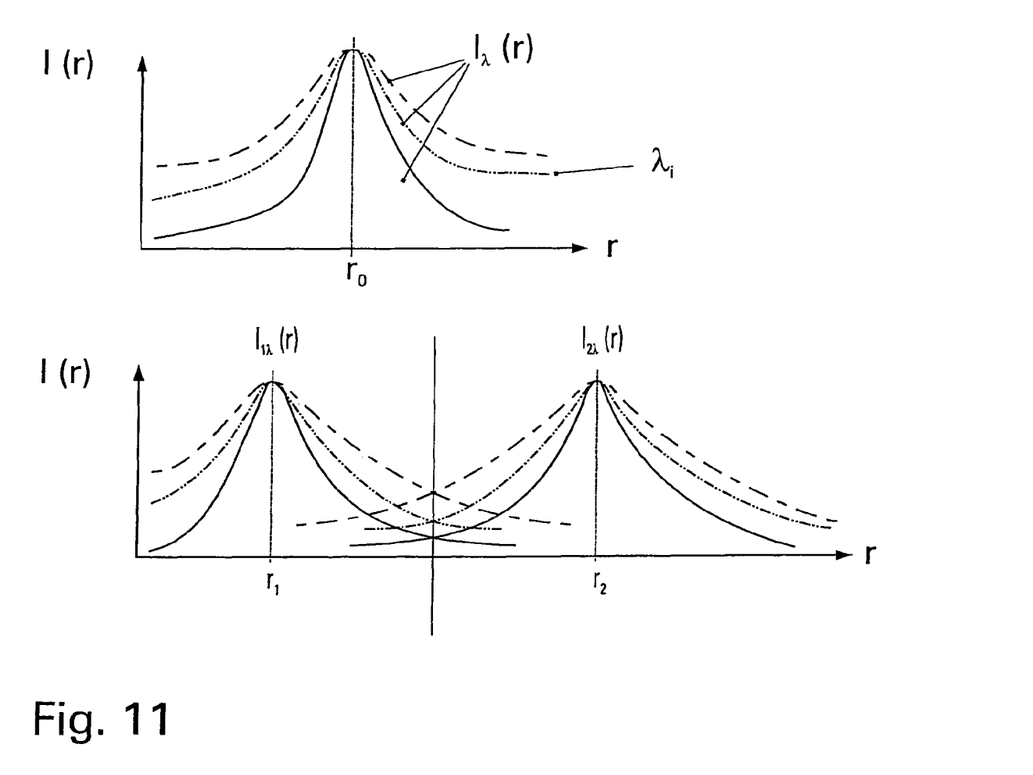

FIG. 11 shows examples for the intensity distribution of the brightness at punctually illuminated locations of a finger. In the analysis, first the place having the maximal intensity of the brightness distribution $I_{max\ 1}(\lambda_i)$ to $I_{max\ 4}(\lambda_i)$ created by the light sources 3.1 to 3.4 is determined and after that, the intensity of the backdiffused light is determined at the place that is located in the center between the places of maximal intensity $P(\lambda i, max)$. The mean value acquired this way is used in the analysis.

As the intensity distributions are different depending on the wavelengths $\lambda i$ of the light of the light sources 3.i, wavelength-specific parameters can be assigned to a vital finger of a person. The more spectral ranges are used for the analysis the higher the security is in recognizing imitations due to the additional discrimination properties.

Because the absorption of light in high oxygen blood differs from that in low oxygen blood, light sources with about $\lambda_1=678$ nm and with about $\lambda_2=835$ nm can be used particularly for recognizing vitality as described above. In case of illumination using $\lambda_1$, the highest sensitivity results for the discrimination between high oxygen blood and low oxygen blood. This can be advantageously used for the proof of a vital object. In case of illumination using $\lambda_2$, no difference is detectable.

An increase of the certainty of proof can be also achieved by switching the light sources in pulse-coded manner and synchronously carrying out the image analysis.

What is claimed is:

1. A method for recognition of biometric data, comprising:
   illuminating an object using a light source;
   simultaneously acquiring a plurality of images of the object from at least two different imaging directions using at least one optical detector device;
   acquiring numerical data for each of at least two of the plurality of images using digital image processing;
   calculating a three-dimensional model of the object from the numerical data of each of the at least two images;
   comparing the three-dimensional model to a reference model, wherein the reference model is acquired from a plurality of other images; and
   recognizing the object as a correct object when the numerical data from the each of the at least two images simultaneously correspond with data from the reference model within a predetermined tolerance,
   wherein the biometric data includes at least one characteristic of one of a finger or a face of a person,
   wherein the illuminating of the object includes directing an illumination path coming laterally from the light source onto the object and wherein the acquiring of numerical data includes analyzing both a reflected portion and a portion transmitted through the object using at least one of a spectroscopic analysis and a scattered-light-spectroscopic analysis and,
   wherein a first wavelength is 678 nm and a second wavelength ranges from 808 nm to 835 nm, the first wavelength representing light to acquire at least one of the plurality of images and the second wavelength representing light to acquire at least one other of the plurality of images.

2. The method as recited in claim 1, wherein characteristic recognition attributes (mF) of dermal ridges of a reference object are acquired in a reference function R(z, y, mF) for acquiring the reference model, and wherein the comparing includes comparing a recognition function F(z, y, mF) describing characteristic recognition attributes (mF) of dermal ridges of the object with the reference model.

3. The method as recited in claim 1, wherein discrete geometric structure attributes are analyzed from at least one of the images.

4. The method as recited in claim 3, wherein the object is a finger and wherein the three-dimensional model describes a geometric shape of a front phalanx of the finger.

5. The method as recited in claim 4, wherein the numerical data includes at least one of a length of the phalanx IG, a width of the phalanx bG, a length of the nail IN, a width of the nail bN, a projected area of the phalanx FG, a projected area of the nailbed FN and a coefficient derived from at least one of 1G, bG, IN, bN, FG, and FN.

6. The method as recited in claim 3, wherein the object is a face, wherein the plurality of images includes a front image and a lateral image, and wherein an ear is at least partially visible in the lateral image.

7. The method as recited in claim 1, wherein the illuminating of the object includes projecting one of a light slit and a light raster onto the object so as to form a contour on a spatial surface of the object, wherein at least one of the plurality of images is acquired using light of a first wavelength and at least one other of the plurality of images is acquired using light of a second wavelength different from the first wavelength used, and wherein a characterizing of the contour of a partial area of the object is used as an additional parameter for recognizing a concordance of the object with the reference model.

8. The method as recited in claim 1, wherein the illuminating is performed punctually using additional light sources in at least one of a visible and infrared spectral range two at least two points on the object and wherein an intensity of the light back diffused from the object is measured at the at least two points and compared to a reference value.

9. The method as recited in claim 8, wherein a place of maximal intensity is determined for the at least two points and a mean value is calculated from the value of at least two intensity centroids.

10. The method as recited in claim 1, wherein the plurality of other images are acquired by skewing the object stepwise around an axis running through the object and wherein at least two of the plurality of other images are saved in several discrete situations respectively and are joined together to at least one three-dimensional model reference model.

11. The method as recited in claim 1, wherein a plurality of light sources are switched in a pulse-coded manner and, synchronously, an analysis of the signals is performed using an image receiver array.

12. An apparatus for carrying out the method according to claims 1, the apparatus comprising:
    at least one illumination device configured to emit at least one of a visible and an infrared light; and
    at least two light detectors configured to acquire independent images.

13. The apparatus as recited in claim 12, wherein the at least two light detectors are disposed in at least one image receiver array.

14. The apparatus as recited in claim 13, wherein the array includes a CMOS array having at least two areas are arranged for acquiring separated images and further comprising a device for optical merging of two images disposed in front of the array.

15. The apparatus as recited in claim 13, wherein the at least one illumination device includes at least two light sources disposed in one of a pairwise and a ring-shaped manner around at least one of the at least two light detectors so as to illuminate the object punctually and wherein the at least one of the at least two light detectors acquires a backscattered intensity distribution.

16. The apparatus as recited in claim 15, wherein a plurality of light detectors acquires the intensity distribution.

17. The apparatus as recited in claim 16, wherein the plurality of light detectors are part of an electronic camera and wherein several images are acquired by the camera from different directions and are merged using beam-combining optical elements.

18. The apparatus as recited in claim 15, wherein for punctual illumination, the at least two light sources are disposed as an independent module.

19. The method as recited in claim 1, wherein the plurality of images of the object from at least two different imaging directions is acquired within a period of time of 0.1 seconds or less.

20. A method for recognition of biometric data, comprising:
- illuminating an object using a light source;
- acquiring a plurality of images of the object from at least two different imaging directions using at least one optical detector device;
- acquiring numerical data for each of at least two of the plurality of images using digital image processing;
- comparing the numerical data to a reference model, wherein the reference model is acquired from a plurality of other images; and
- recognizing the object as a correct object when the numerical data from the each of the at least two images correspond with data from the reference model within a predetermined tolerance,
- wherein the illuminating of the object includes directing an illumination path coming laterally from the light source onto the object and wherein the acquiring of numerical data includes analyzing both a reflected portion and a portion transmitted through the object using at least one of a spectroscopic analysis and a scattered-light-spectroscopic analysis, and
- wherein a first wavelength is 678 nm and a second wavelength ranges from 808 nm to 835 nm, the first wavelength representing light to acquire at least one of the plurality of images and the second wavelength representing light to acquire at least one other of the plurality of images.

* * * * *